(12) United States Patent
Remington

(10) Patent No.: US 11,692,715 B2
(45) Date of Patent: Jul. 4, 2023

(54) COOKING APPARATUS HAVING CHANGEABLE HEAT SOURCE

(71) Applicant: David Travis Remington, Atlanta, GA (US)

(72) Inventor: David Travis Remington, Atlanta, GA (US)

( * ) Notice: Subject to any disclaimer, the term of this patent is extended or adjusted under 35 U.S.C. 154(b) by 453 days.

(21) Appl. No.: 17/026,779

(22) Filed: Sep. 21, 2020

(65) Prior Publication Data
US 2021/0088219 A1    Mar. 25, 2021

Related U.S. Application Data

(60) Provisional application No. 62/903,350, filed on Sep. 20, 2019.

(51) Int. Cl.
*F24C 1/06* (2021.01)
*F24C 15/18* (2006.01)

(52) U.S. Cl.
CPC ............... *F24C 1/06* (2013.01); *F24C 15/18* (2013.01)

(58) Field of Classification Search
None
See application file for complete search history.

(56) References Cited

U.S. PATENT DOCUMENTS

| | | | | |
|---|---|---|---|---|
| 5,275,147 A * | 1/1994 | Aktinson, III | ............ | F24C 1/04 126/39 BA |
| 5,890,483 A * | 4/1999 | Stevenson | ................. | F24C 3/14 126/92 AC |
| 6,176,233 B1 * | 1/2001 | Babington | ............... | A47J 36/26 126/39 C |
| 10,206,537 B1 * | 2/2019 | Ebbes | .................. | A47J 37/0786 |
| 2003/0019492 A1 * | 1/2003 | Williams | ............. | A47J 37/0704 126/41 R |
| 2003/0217647 A1 * | 11/2003 | Jones | ..................... | G06Q 10/10 99/450 |
| 2015/0122241 A1 * | 5/2015 | Grant | ..................... | F23B 50/12 110/170 |
| 2016/0161146 A1 * | 6/2016 | Deng | ..................... | F23N 1/007 431/285 |
| 2016/0290631 A1 * | 10/2016 | Deng | ......................... | F23C 1/00 |
| 2017/0095106 A1 * | 4/2017 | Cook | .................. | A47J 37/0713 |
| 2017/0164783 A1 * | 6/2017 | Sauerwein | .......... | A47J 37/0786 |
| 2019/0150664 A1 * | 5/2019 | Ramirez | ............ | A47J 37/0763 |

* cited by examiner

*Primary Examiner* — David J Laux
(74) *Attorney, Agent, or Firm* — Womble Bond Dickinson (US) LLP

(57) ABSTRACT

A cooking apparatus may include a cooking chamber at least partially defining an interior volume and a substantially open upper portion. The cooking chamber may include a side wall at least partially defining a lower portion of the cooking chamber. The cooking apparatus may also include a lid configured to substantially close the upper portion of the cooking chamber. The cooking apparatus may further include a heating module configured to be coupled to, and removed from, at least one of the side wall or the lower portion of the cooking chamber. The heating module may be configured to provide a source of heat for the cooking apparatus, and, in some examples, the heating module may be configured to generate heat using at least one of a flammable gas, charcoal, pellets, or wood.

19 Claims, 14 Drawing Sheets

COOKING APPARATUS HAVING CHANGEABLE HEAT SOURCE

PRIORITY CLAIM

This U.S. non-provisional patent application claims priority to and the benefit of, under 35 U.S.C. § 119(e), U.S. Provisional Application No. 62/903,350, filed Sep. 20, 2019, the disclosure of all of which is incorporated herein by reference in its entirety.

TECHNICAL FIELD

The present disclosure relates to systems and methods providing a cooking apparatus having changeable heat sources and, more particularly, to systems and methods for providing a cooking apparatus having changeably heat sources and changeable accessories.

BACKGROUND

Barbeque grills for cooking food are available in various forms. For example, a charcoal-type barbeque grill is designed to cook food using heat generated burning charcoal. Some barbeque grills are designed to cook food using an ignited flammable gas, such as propane or natural gas. A barbeque grill sometimes referred to as a "smoker" is designed to cook food slowly using wood or charcoal. Such barbeque grills may suffer from possible drawbacks. For example, a barbeque grill designed to generate heat using charcoal may not be not suitable to use a flammable gas to generate heat, and a barbeque grill designed to use flammable gas to generate heat may not be not suitable to use charcoal to generate heat. Similarly, a smoker may not be suitable to use flammable gas to generate heat. This may render it necessary to obtain more than one type of barbeque grill to obtain the characteristics of food cooked on more than one type of barbeque grill.

Accordingly, Applicant has recognized a need for systems and methods that provide greater flexibility for cooking using different types of heat sources. The present disclosure may address one or more of the above-referenced drawbacks, as well as other possible drawbacks.

SUMMARY

According to a first aspect, a cooking apparatus may include a cooking chamber at least partially defining an interior volume and a substantially open upper portion. The cooking chamber may include a side wall at least partially defining a lower portion of the cooking chamber and a lid configured to substantially close the upper portion of the cooking chamber. The cooking apparatus may also include a heating module configured to be coupled to, and removed from, at least one of the side wall or the lower portion of the cooking chamber. The heating module may be configured to provide a source of heat for the cooking apparatus. The heating module may be configured to generate heat using at least one of a flammable gas, charcoal, pellets, or wood.

In still another aspect, a cooking apparatus may include a cooking chamber at least partially defining an interior volume and a substantially open upper portion. The cooking chamber may include a side wall at least partially defining a lower portion of the cooking chamber. The cooking apparatus may further include a lid configured to substantially close the upper portion of the cooking chamber. The cooking apparatus may also include a heating module configured to be coupled to, and removed from, at least one of the side wall or the lower portion of the cooking chamber. The cooking apparatus may further include a twist-and-engage mechanism configured to selectively couple the heating module to the at least one of the side wall or the lower portion of the cooking chamber. The heating module may be configured to provide a source of heat for the cooking apparatus.

In yet another aspect, a method for converting a cooking apparatus from a first configuration intended for use with a first heat source to a second configuration intended for use with a second heat source may include separating a first heating module from a cooking chamber of the cooking apparatus. The first heating module may be configured to generate heat using at least one first heating medium. The method may further include coupling a second heating module to the cooking chamber. The second heating module may be configured to generate heat using at least one second heating medium different than the at least one first heating medium. The at least one first heating medium and the at least one second heating medium may include one or more of a flammable gas, charcoal, wood, or pellets.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

Figure 1:
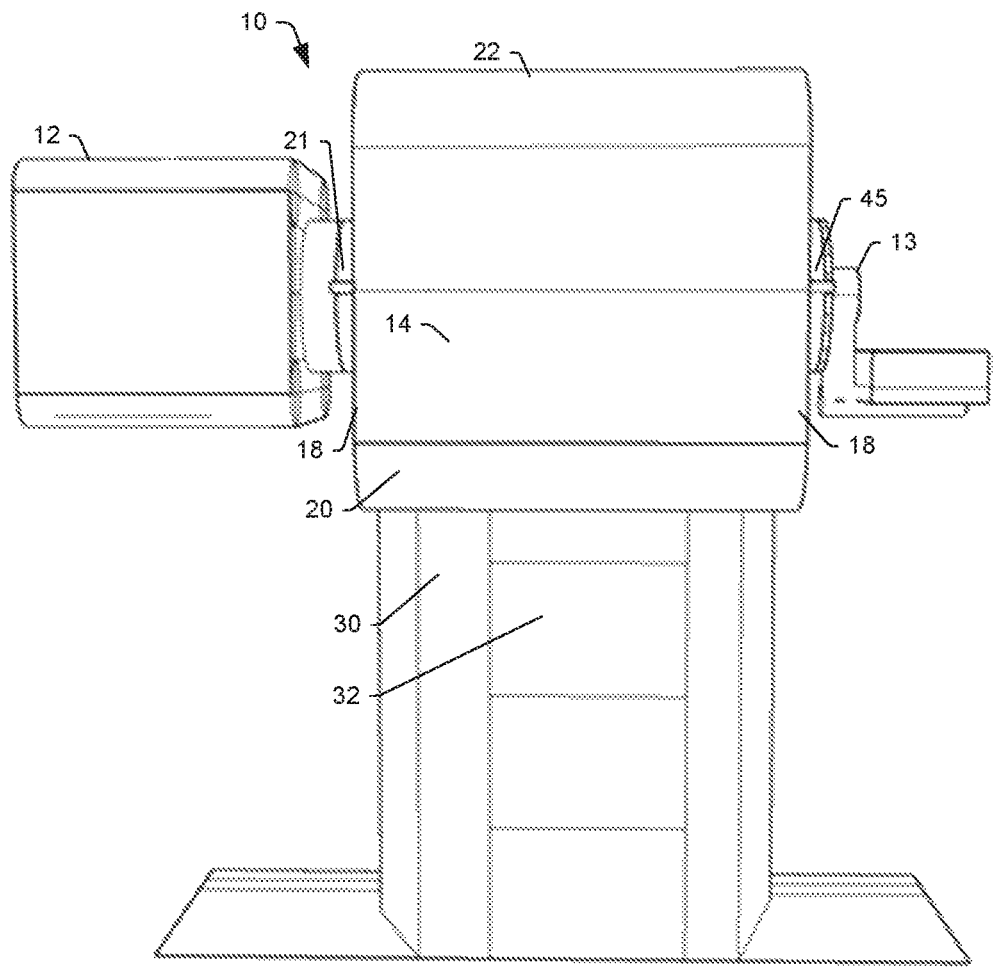
FIG. 1 is a schematic front view of an example cooking apparatus including an example heating module and an example accessory module coupled to the cooking apparatus.
Figure 2:
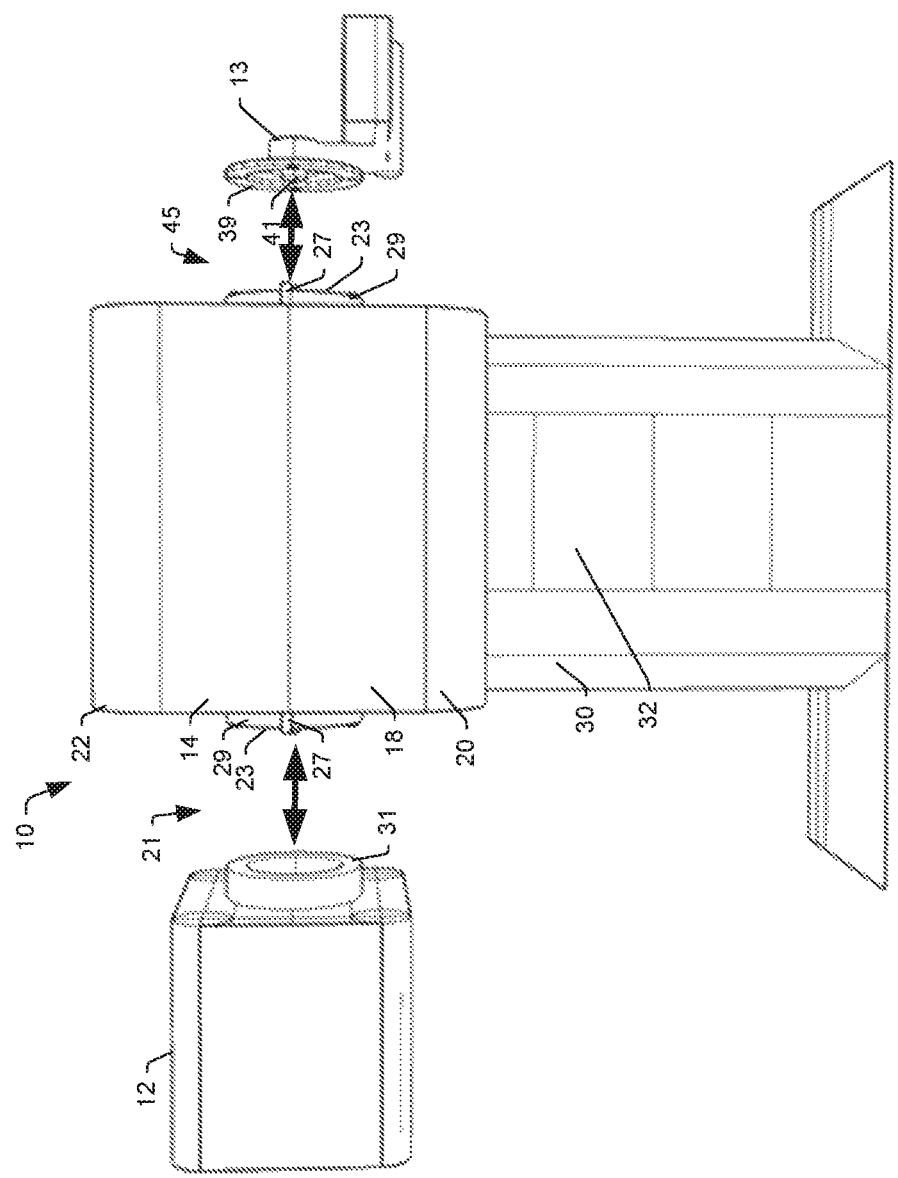
FIG. 2 is a schematic exploded front view of the example cooking apparatus shown in FIG. 1.

The drawings may use like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

This disclosure is generally directed to a cooking apparatus that may be converted from a first configuration in which a first heating medium may be used to generate heat for cooking and/or smoking food, to a second configuration in which a different heating medium may be used to generate heat for cooking and/or smoking food. For example, the cooking apparatus may include a cooking chamber and a heating module configured to facilitate generation of heat using a first heating medium. The cooking chamber may include a fixture for coupling the heating module to, and decoupling the heating module from, the cooking chamber. In some examples, the heating module may be decoupled from the cooking chamber, and another heating module configured to generate heat using a second, different heating medium, may be coupled to the cooking chamber, so that the second heating medium may be used to generate heat for cooking and/or smoking food.

In some examples, a plurality of different heating modules may be provided, each being configured to generate heat using a different heating medium. A heating module coupled to the cooking chamber and configured to generate heat using a first heating medium may be exchanged for any of one or more other heating modules, each configured to generate heat using a different heating medium. In this example manner, a single cooking chamber may be converted for heating and/or smoking using any one of a number of different heating media. In some examples, the different heating media may include, for example, flammable gas (e.g., propane and/or natural gas), charcoal, wood, and/or pellets (e.g., wood pellets). This may facilitate the use of different cooking techniques using a single cooking apparatus and a selected one of two or more heating modules and corresponding heating media.

This disclosure is also generally directed to a cooking apparatus that may include a cooking chamber at least partially defining an interior volume and a substantially open upper portion. The cooking chamber may include a side wall at least partially defining a lower portion of the cooking chamber. The cooking apparatus may also include a lid configured to substantially close the upper portion of the cooking chamber. The cooking apparatus may further include a heating module configured to be coupled to, and removed from, at least one of the side wall or the lower portion of the cooking chamber. The heating module may be configured to provide a source of heat and/or smoke for the cooking apparatus, and, in some examples, the heating module may be configured to generate heat using at least one of a flammable gas, charcoal, pellets, or wood. Other sources of heat and/or smoke are contemplated.

In some examples, the heating module may be configured to be coupled to, and removed from, the side wall of the cooking chamber. In some such examples, the heating module may be configured to generate heat using one or more of charcoal or wood. In some examples, the heating module may be configured to be coupled to, and removed from, the lower portion of the cooking chamber. In some such examples, the heating module may include a burner configured to be in flow communication with a source of a flammable gas and distribute heat within the cooking chamber. In some examples, the heating module may include a chamber configured to receive one or more of charcoal, wood, or pellets to generate heat.

In some examples of the cooking apparatus, the cooking chamber may include a first coupling device, and the heating module may include a second coupling device, and the first coupling device and the second coupling device may be configured to engage and disengage one another to facilitate coupling of the heating module to, and removal of the heating module from, the cooking chamber. For example, the lower portion of the cooking chamber may define a lower opening. In some such examples, the cooking apparatus may include a lower cooking chamber fixture adjacent the lower opening, and the heating module may include a module fixture configured to engage the lower cooking chamber fixture. In some examples, the side wall of the cooking chamber may define a side opening, and the cooking apparatus may include a side cooking chamber fixture adjacent the side opening. In some such examples, the heating module may include a module fixture configured to engage the side cooking chamber fixture. In some examples, one or more of the lower cooking chamber fixture or the side cooking chamber fixture may include a first rail, and the module fixture may include a second rail. In some such examples, the first rail and the second rail may be configured to slidably engage one another and facilitate coupling and decoupling of the heating module and the cooking chamber.

In some examples, one or more of the lower cooking chamber fixture or the side cooking chamber fixture may include one or more first fasteners, and the module fixture may include one or more second fasteners. In some such examples, the one or more first fasteners and the one or more second fasteners may be configured to engage one another and facilitate coupling and decoupling of the heating module and the cooking chamber. For example, the one or more first fasteners may include one of a stud or a nut, and the one or more second fasteners may include the other of a stud or a nut.

This disclosure is also generally directed to a method for converting a cooking apparatus from a first configuration intended for use with a first heat source to a second configuration intended for use with a second heat source. The method may include separating a first heating module from a cooking chamber of the cooking apparatus. The first heating module may be configured to generate heat using at least one first heating medium. The method may also include coupling a second heating module to the cooking chamber. The second heating module may be configured to generate heat using at least one second heating medium different than the at least one first heating medium. For example, the at least one first heating medium and the at least one second heating medium may include one or more of a flammable gas, charcoal, wood, or pellets.

In some examples, separating the first heating module from the cooking chamber may include removing at least one fastener coupling the first heating module to the cooking chamber. In some such examples, coupling the second heating module to the cooking chamber may include securing at least one fastener, such that the least one fastener couples the second heating module to the cooking chamber. In some examples, separating the first heating module from the cooking chamber may include slidably disengaging the first heating module from the cooking chamber. In some such examples, coupling the second heating module to the cooking chamber may include slidably engaging the second heating module with the cooking chamber.

In some examples, the cooking apparatus may facilitate heating using a number of different types of heating sources, such as, for example, flammable gas (e.g., propane and/or natural gas), charcoal, wood, and/or pellets (e.g., wood pellets). For example, the heating modules may facilitate exchanging a heating module configured to generate heat and/or smoke using a first type of medium (e.g., charcoal) for another heating module configured to use a different type of heating medium (e.g., flammable gas or wood). Thus, in some examples, the cooking apparatus may facilitate changing between different heating media, without necessarily requiring switching entire cooking apparatuses.

In some examples, the heating module may be coupled to the cooking chamber via a universal coupler configured to facilitate coupling the heating module to, and decoupling the heating module from, the cooking apparatus, for example, to provide the ability to exchange a first heating module configured to generate heat and/or smoke using a first heating medium, for a second heating module configured to generate heat and/or smoke using a second heating medium different from the first heating medium. In some examples, the universal coupler may include a heating module coupler associated with the heating module, and a cooking chamber coupler associated with the cooking chamber. In some such examples, the heating module coupler and the cooking chamber coupler may be configured to be coupled and decoupled from one another, for example, thereby coupling and decoupling the heating module and the cooking chamber to one another.

In some examples, the heating modules may be coupled and secured to the cooking chamber via a twist-and-engage mechanism. In some examples, the heating module may be coupled to the side wall of the cooking chamber by first holding the side of the heating module against the side of the cooking chamber, such that an aperture in the side of the heating module and a corresponding aperture in the side the cooking chamber are substantially aligned, and a pivoting engagement handle may be moved from a first position to a second position at which the heating module and the cooking chamber are secured to one another. In some embodiments, in the second position, a securing mechanism may prevent the heating module from separating from the cooking chamber until the pivoting engagement handle is returned to the first position, disengaging the securing mechanism and allowing separation of the heating module from the cooking chamber. Some examples may include magnets as the securing mechanism. Other configurations of twist-and-engage mechanisms and/or securing mechanisms are contemplated.

In some examples, accessory modules may be selectively secured to the cooking apparatus, for example, the cooking chamber. Accessory modules may include any devices that may be useful for assisting and/or entertaining a person while using the cooking apparatus, such as, for example, lighting, fans, speakers for wireless connection to audio devices, smartphones, tablets, towel dispensers, cooking utensil holders, etc. Other types of accessory modules are contemplated. In some examples, the accessory modules may be selectively coupled to the cooking apparatus in a manner at least similar to the heating modules. Other ways of selectively coupling the accessory modules to the cooking apparatus are contemplated.

FIGS. 1-11 are schematic views of an example cooking apparatus 10 including an example heating module 12 and an example accessory module 13 coupled to the cooking apparatus 10. In the example shown in FIGS. 1-11, the cooking apparatus 10 includes a cooking chamber 14 at least partially defining an interior volume and a substantially open upper portion 16. Although the heating module 12 and the accessory module 13 are shown on the left and right opposing sides of the cooking apparatus (as shown in the front view), accessory modules 13 may be coupled to the left side of the cooking apparatus 10, and the cooking modules 12 may be coupled to the right side of the cooking apparatus 10. In some examples, the heating modules 12 and/or the accessory modules 13 may be exchanged with alternative heating modules having different heating characteristics/functions, and/or alternative accessory modules having different characteristics/functions, respectively. For example, the heating module 12 may be configured to use, for example, different heating media, such as electric, wood, charcoal, wood pellets, gas (e.g., propane or natural gas), a griddle, a stove-top-style burner, a rotisserie, etc. In some examples, the heating modules 12 may include a removable and/or pivoting top or side door for allowing access to the interior of the heating module 12. In some examples, the heating modules 12 may include any configurations or components for facilitating heating using the desired heating medium.

The accessory modules 13 may include different accessories or groups of accessories, such as, for example, lighting, fans, speakers for wireless connection to audio devices, smartphones, tablets, towel dispensers, cooking utensil holders, etc. Other types of heating modules 12 and accessory modules 13 are contemplated. Although the example cooking chamber 14 shown in FIGS. 1-11 has a substantially rectangular cross-sectional shape, other cross-sectional shapes are contemplated, such as, for example, substantially circular, oval-shaped, or other geometric shapes. The cooking chamber 14 may be formed from metal, such as, for example, steel, stainless steel, and/or aluminum, and/or from ceramic materials.

The example cooking chamber 14 shown in FIGS. 1-11 includes a side wall 18, which may define one of more chamber apertures 19, for example, on opposites sides of the side wall 18 (e.g., at opposite ends of the cooking chamber 14 as shown). One or more of the chamber apertures 19 may provide a heat path for heat and/or smoke to enter the interior of the cooking chamber 14 from a heating module 12. In some examples, one or more of the chamber apertures 19 may provide an access port for providing a connection to a source of energy for the heating module 12 or accessory module 13, such as, for example, a source of propane for using to heat a stove-top-style burner. In some examples, a cover plate may be provided to close-off one or more of the chamber apertures 19, for example, to substantially prevent heat and/or smoke from escaping the interior of the cooking chamber 14 and/or for protecting accessories. In addition, the cover plate in some examples may serve to prevent ingress/egress of air and/or heat in order to substantially seal the cooking chamber 14 and/or prevent intrusion of external elements, such as rain, sleet, snow, dirt, leaves, hands, small animals, etc.

Figure 12:
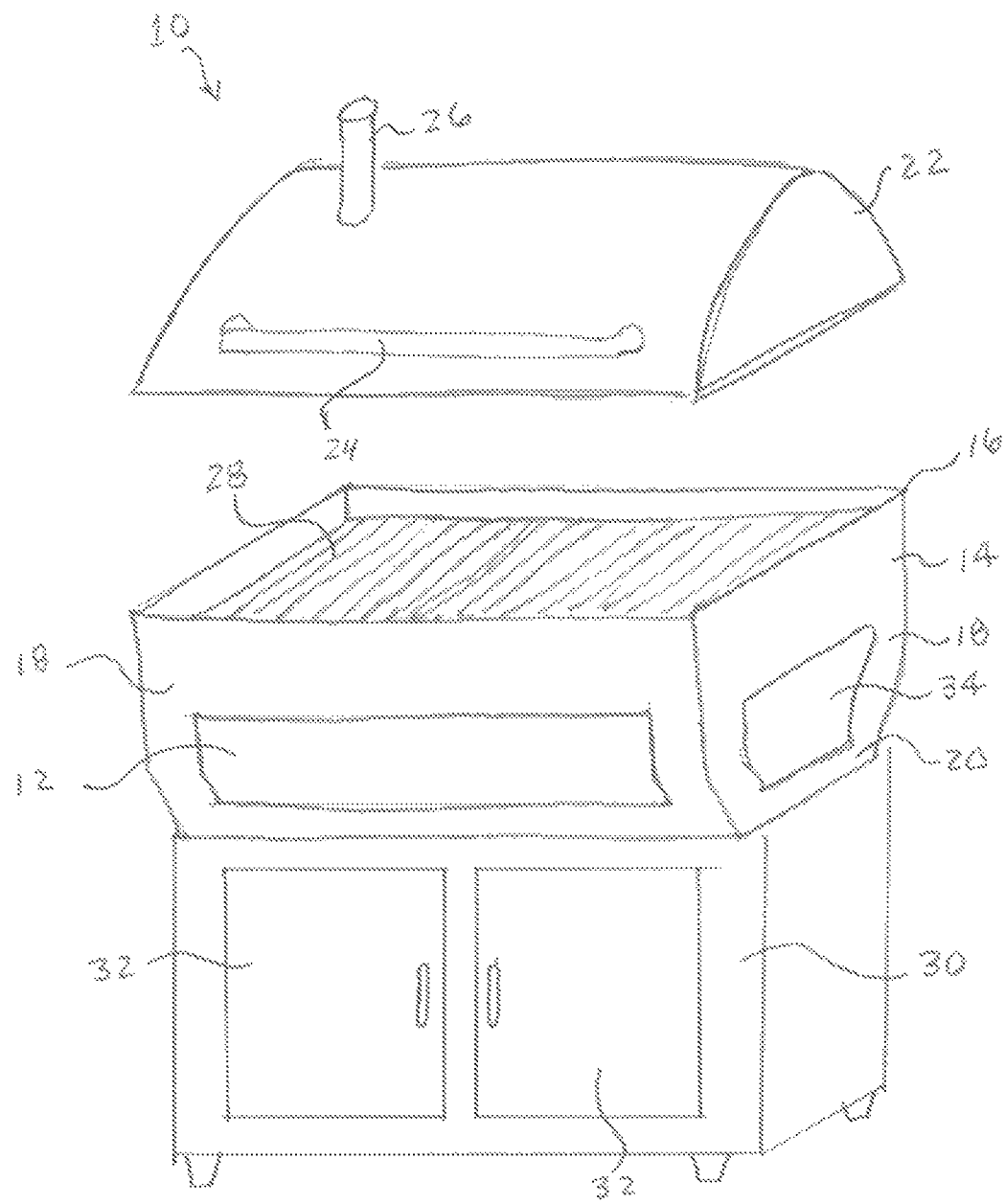
FIG. 12 is a schematic perspective view of another example cooking apparatus including an example heating module coupled to the cooking apparatus.
Figure 13:
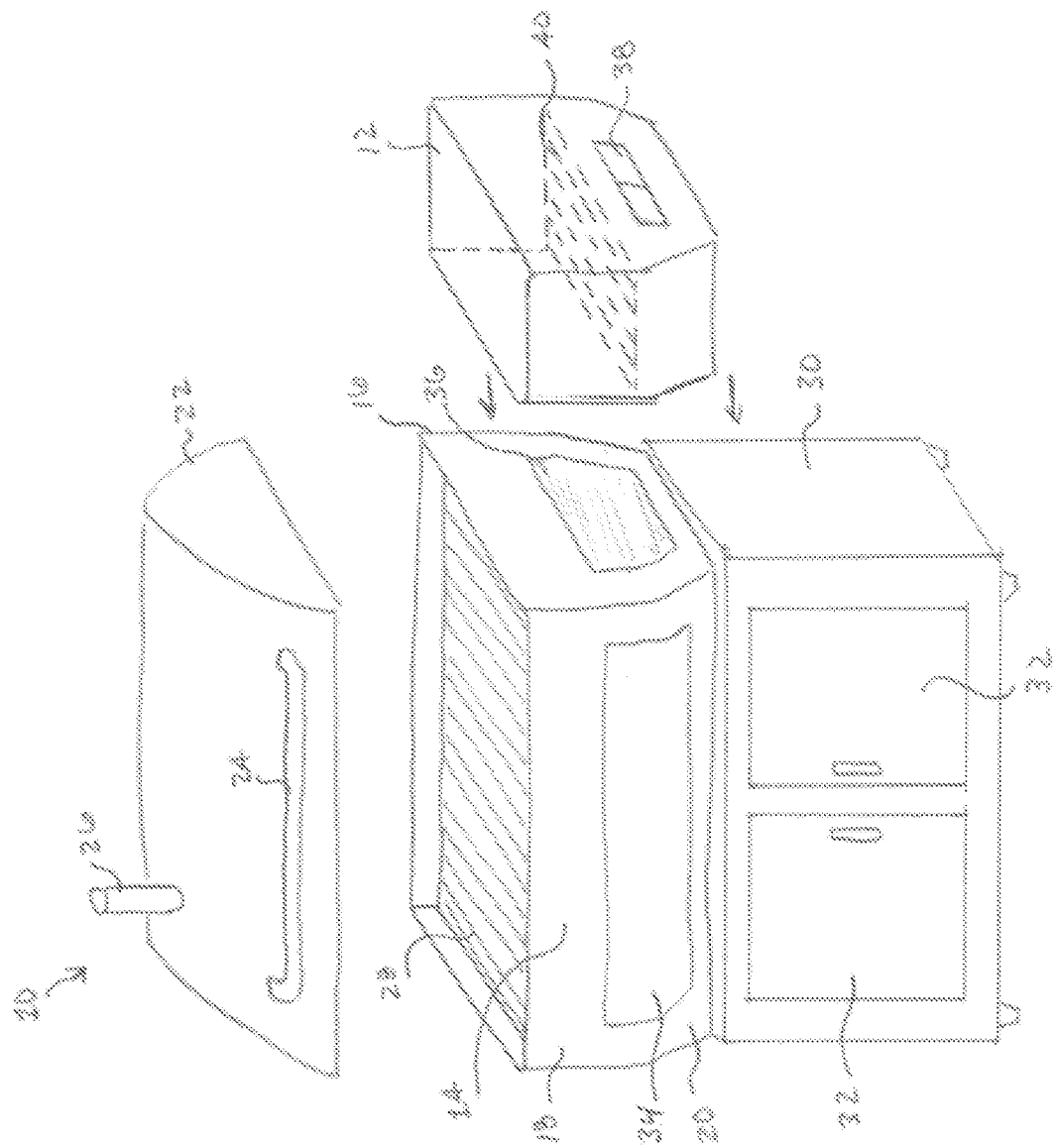
FIG. 13 is a schematic perspective view of the example cooking apparatus shown in FIG. 12, including another example heating module in the process of being moved toward a cooking chamber of the cooking apparatus for being coupled to the cooking chamber.

As shown, the side wall 18 may at least partially define a lower portion 20 of the cooking chamber 14. The example cooking apparatus 10 shown also includes a lid 22 configured to substantially close the upper portion 16 of the cooking chamber 14. Some examples of the lid 22 may include a handle 24 (e.g., as shown in FIGS. 12 and 13) and, in some examples, the lid 22 may be fixed to the upper portion 16 of the cooking chamber 14 via one or more hinges, so that the lid 22 may pivot between a closed position and an open position without separating from the cooking chamber 14. In some examples, the lid 22 may be configured to be separated from the cooking chamber 14, but may include catches or hooks for hanging the lid 22 on an edge of the cooking chamber 14 by removal of the lid 222 from the cooking chamber 14.

In some examples, the lid 22 (or the side wall 18) may include a vent 26 (e.g., an adjustable vent, see, e.g., FIGS. 12 and 13), for example, for allowing heat to be vented from the cooking chamber 14 in a controlled manner. As shown in FIG. 12, the cooking apparatus 10 may also include a cooking surface 28 (e.g., a grate, a griddle, and/or a pan) on which food items to be heated/cooked may be placed. In some examples, the cooking apparatus 10 may also include a cabinet 30 for storage and/or access to an underside of the cooking chamber 14, and/or a place for receipt of a propane tank 15 (see, e.g., FIG. 3). The cabinet 30 may include one or more doors 32 configured to permit access to the interior of the cabinet 30 and/or access to the underside of the cooking chamber 14.

Figure 5:
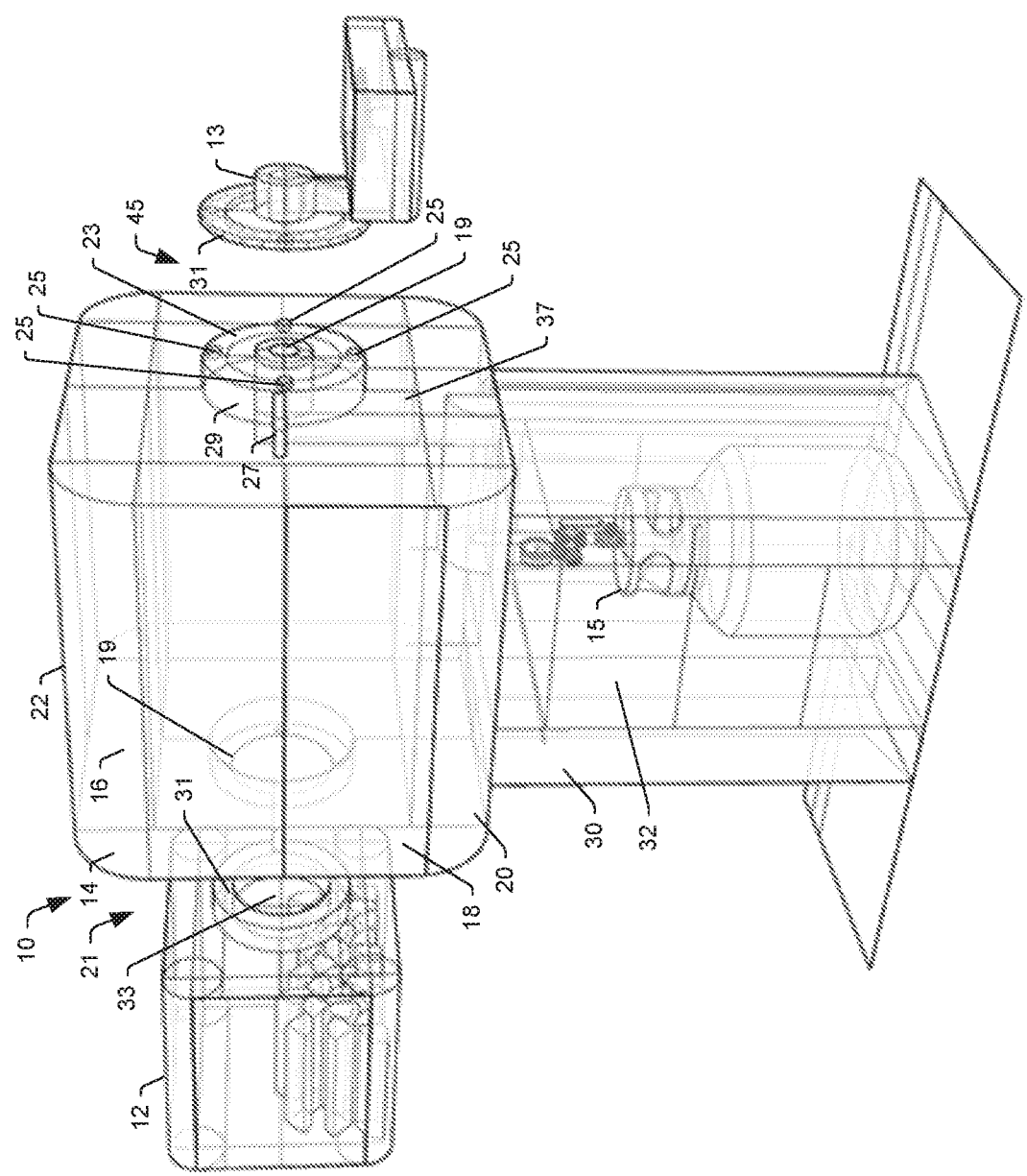
FIG. 5 is a schematic exploded front perspective transparent view of the example cooking apparatus shown in FIG. 1.
Figure 6:
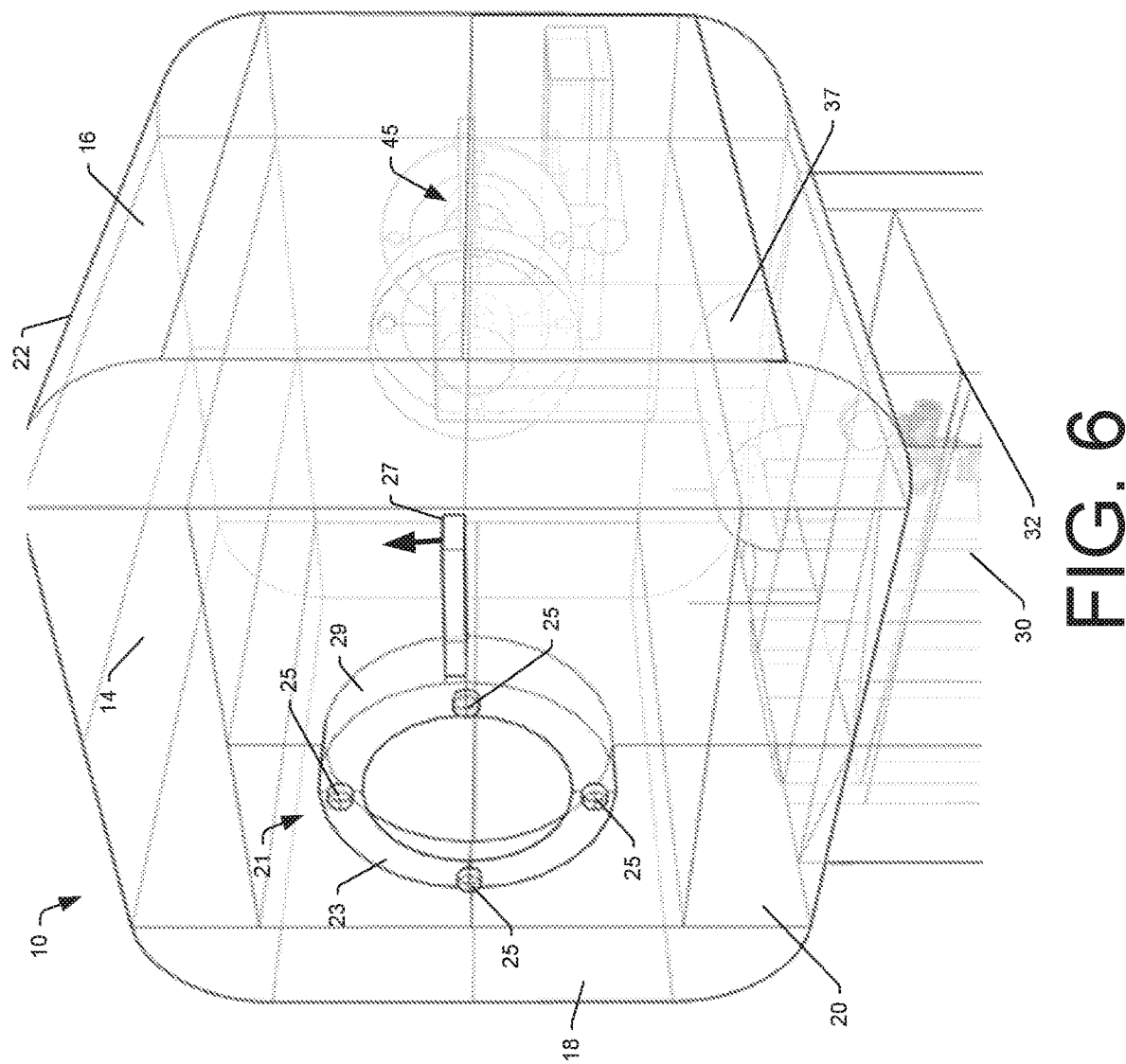
FIG. 6 is a schematic exploded side perspective transparent view of the example cooking apparatus shown in FIG. 1.
Figure 7:
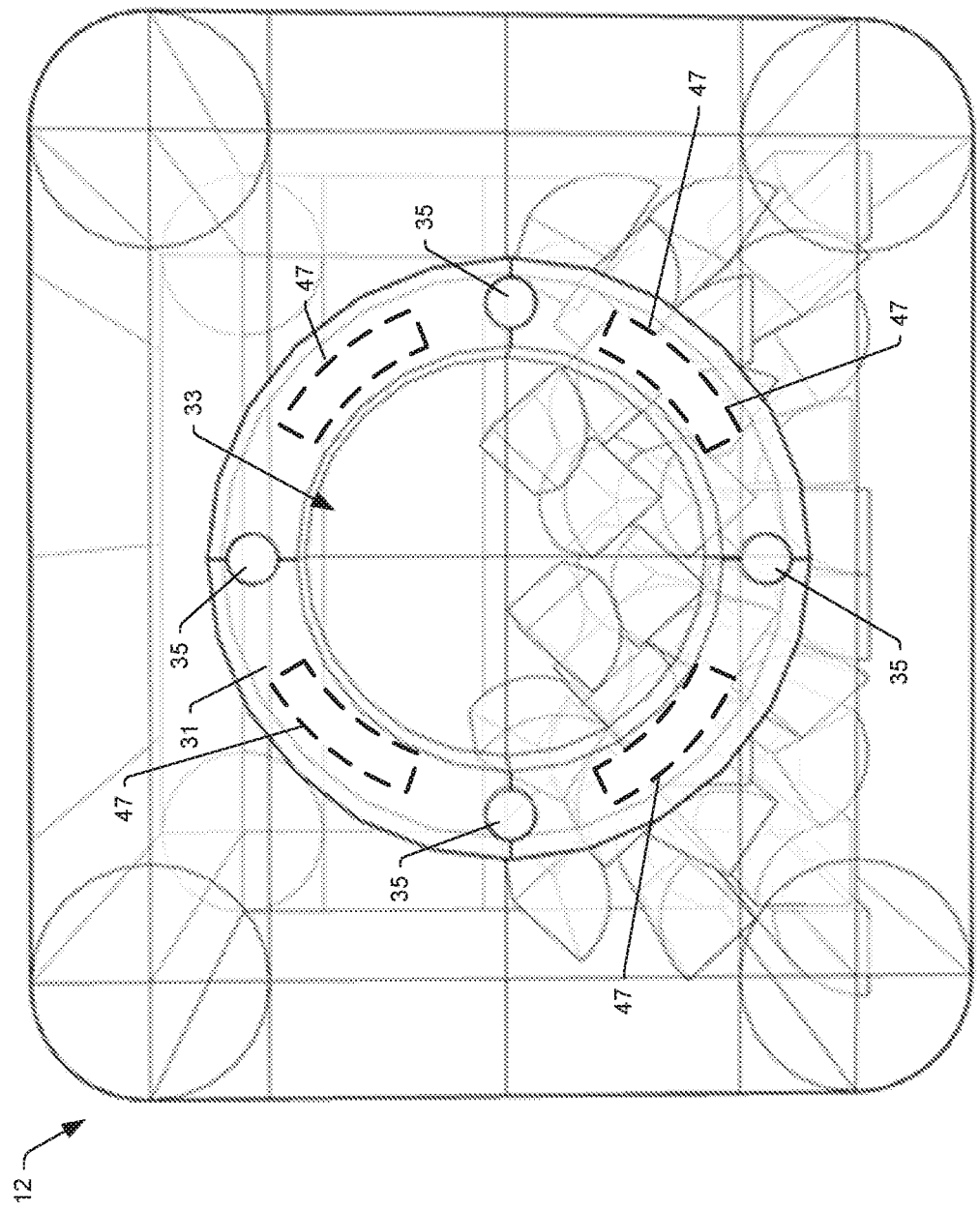
FIG. 7 is a schematic side transparent view of the example heating module shown in FIG. 1.

As mentioned above and shown in FIGS. 1-15, the cooking apparatus 10 may include a heating module 12 configured to be coupled to, and removed from, the cooking chamber 14. For example, as shown in FIGS. 5, 6, and 9, the side wall 18 of the cooking chamber 14 may define one or more chamber apertures 19, for example, on opposites sides of the side wall 18 (e.g., at opposite ends of the cooking chamber 14 as shown). One or more of the chamber apertures 19 may provide a heat path for heat and/or smoke to enter the interior of the cooking chamber 14 from a heating module 12.

In some examples, the cooking apparatus 10 may include a twist-and-engage mechanism 21 for selectively securing and releasing the heating module 12 to and from the cooking chamber 14. For example, the cooking chamber 14 may include a raised chamber coupling surface 23 for providing surface against which a corresponding portion of the heating module 12 may abut and form a substantially fluid-tight seal, so that heat and/or smoke generated in the heating module 12 may pass into the interior of the cooking chamber 14 without escaping at the interface between the heating module 12 and the cooking chamber 14. In the example shown, the chamber coupling surface 23 is formed by an annular extension from the side wall 18 adjacent (e.g., surrounding) the corresponding chamber aperture 19. The cooking chamber 14 may also include a plurality of nodes 25 (e.g., bosses) (e.g., in the raised chamber coupling surface 23), each configured to be received in a corresponding recess in the heating module 12, as discussed below.

As shown in FIG. 6, some embodiments of the twist-and-engage mechanism 21 may also include a pivoting engagement handle 27 configured to pivot between a first position for selectively receiving or releasing the heating module 14 and a second position for engaging the heating module 12 to secure the heating module 12 to the cooking chamber 14 at the chamber aperture 19. In some embodiments, the twist-and-engage mechanism 21 may include one or more chamber engagement structures configured to secure the heating module 12 to the cooking chamber 14. For example, as shown in FIG. 6, the pivoting engagement handle 27 may be coupled to a chamber ring 29 configured to rotate as the pivoting engagement handle 27 pivots between the first and second positions. In some embodiments, the chamber ring 29 may include one or more magnets 47 (see, e.g., FIGS. 7, 8, 10, and 11) (e.g., high strength magnets and/or heat-resistant magnets) that rotate with the chamber ring 29 and/or switch polarity relative to corresponding magnets 47 on the heating module 12. In some examples using magnets, a heat insulating shield may be provided to protect the magnets from heat generated by the heating module 12 and/or within the cooking chamber 14.

As shown in FIGS. 2, 3, 4, and 7, some embodiments of the heating chamber 12 may include a raised module coupling surface 31 for providing complimentary surface against which a corresponding portion of the raised chamber coupling surface 23 of the heating module 12 may abut and form a substantially fluid-tight seal, so that heat and/or smoke generated in the heating module 12 may pass into the interior of the cooking chamber 14 without escaping at the interface between the heating module 12 and the cooking chamber 14. In the example shown, the module coupling surface 31 may be formed by an annular extension from a side wall of the heating module 12 adjacent (e.g., substantially surrounding) a corresponding module aperture 33 for providing flow into the heating chamber 14 through a corresponding chamber aperture 19. The raised module coupling surface 31 may also include a plurality of complimentary nodes 35 (e.g., recesses) configured to receive a corresponding node 25 (e.g., a boss) of the cooking chamber 14 (e.g., on the raised chamber coupling portion 23).

In some embodiments, when coupling the heating module 12 to the cooking chamber 14, the raised module coupling surface 31 of the heating module 12 may be brought into contact with the raised chamber coupling portion 23 of the cooking chamber 14, such that the alignment nodes 25 of the cooking chamber 14 are received in the complimentary nodes 35 of the heating module 12. While holding the heating module 12 against the cooking chamber 14 in this manner, the pivoting engagement handle 27 maybe moved (pivoted) from its first position to the second position, so that the chamber engagement structures (e.g., magnets 47) secure the heating module 12 onto the cooking chamber 14, with the chamber apertures 19 and the module aperture 33 being aligned with one another, providing a heat path for heat and/or smoke in the heating module chamber 12 to pass into the interior of the cooking chamber 14. To release and separate the heating module 12 form the cooking chamber 14, the pivoting engagement handle 27 may be moved back to the first position, so the chamber engagement structures (e.g., magnets) no longer secure the heating module 12 to the cooking chamber 14.

Figure 8:
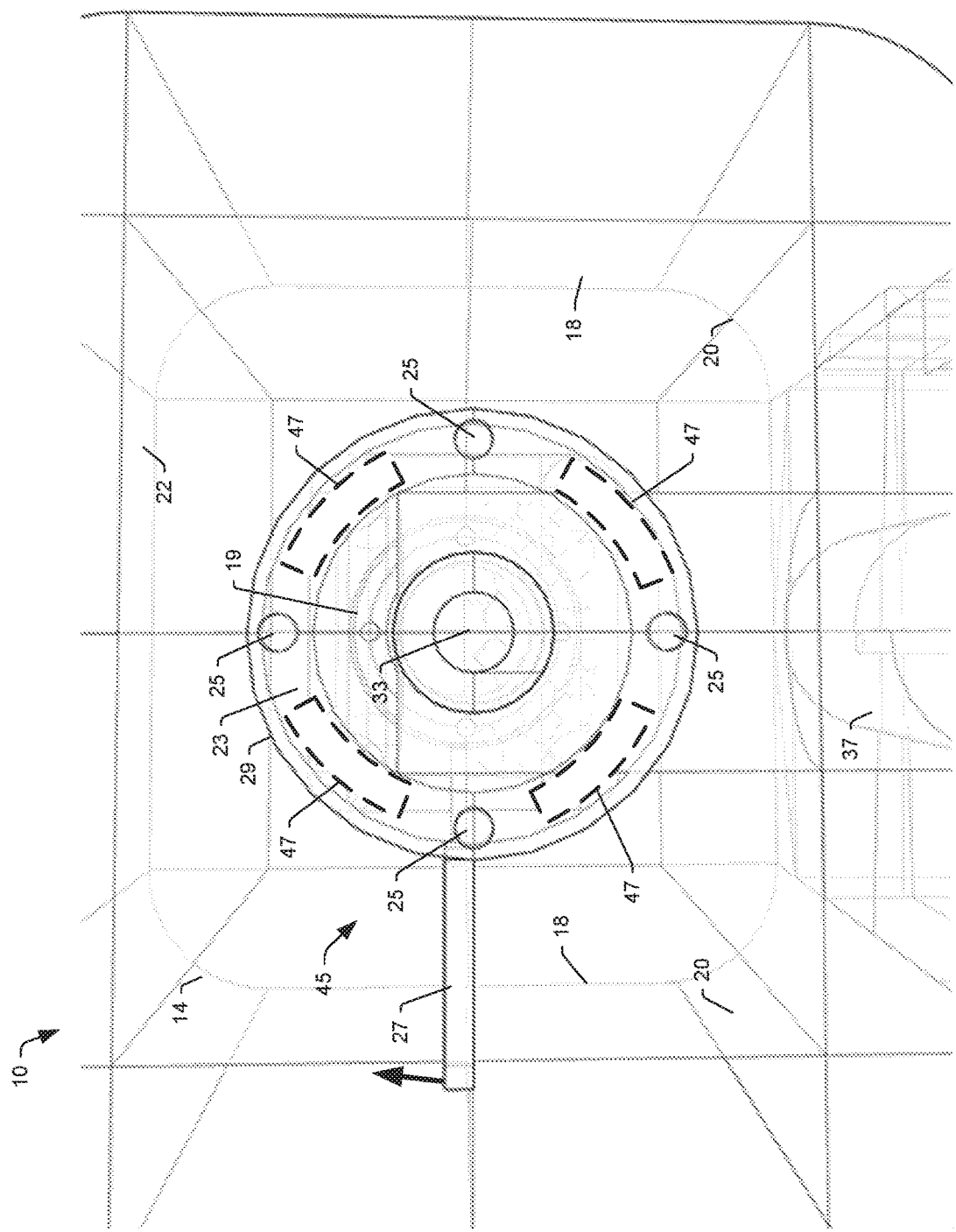
FIG. 8 is a schematic side transparent view from the interior of an example cooking chamber of the example cooking apparatus shown in FIG. 1 facing the example heating module.
Figure 9:
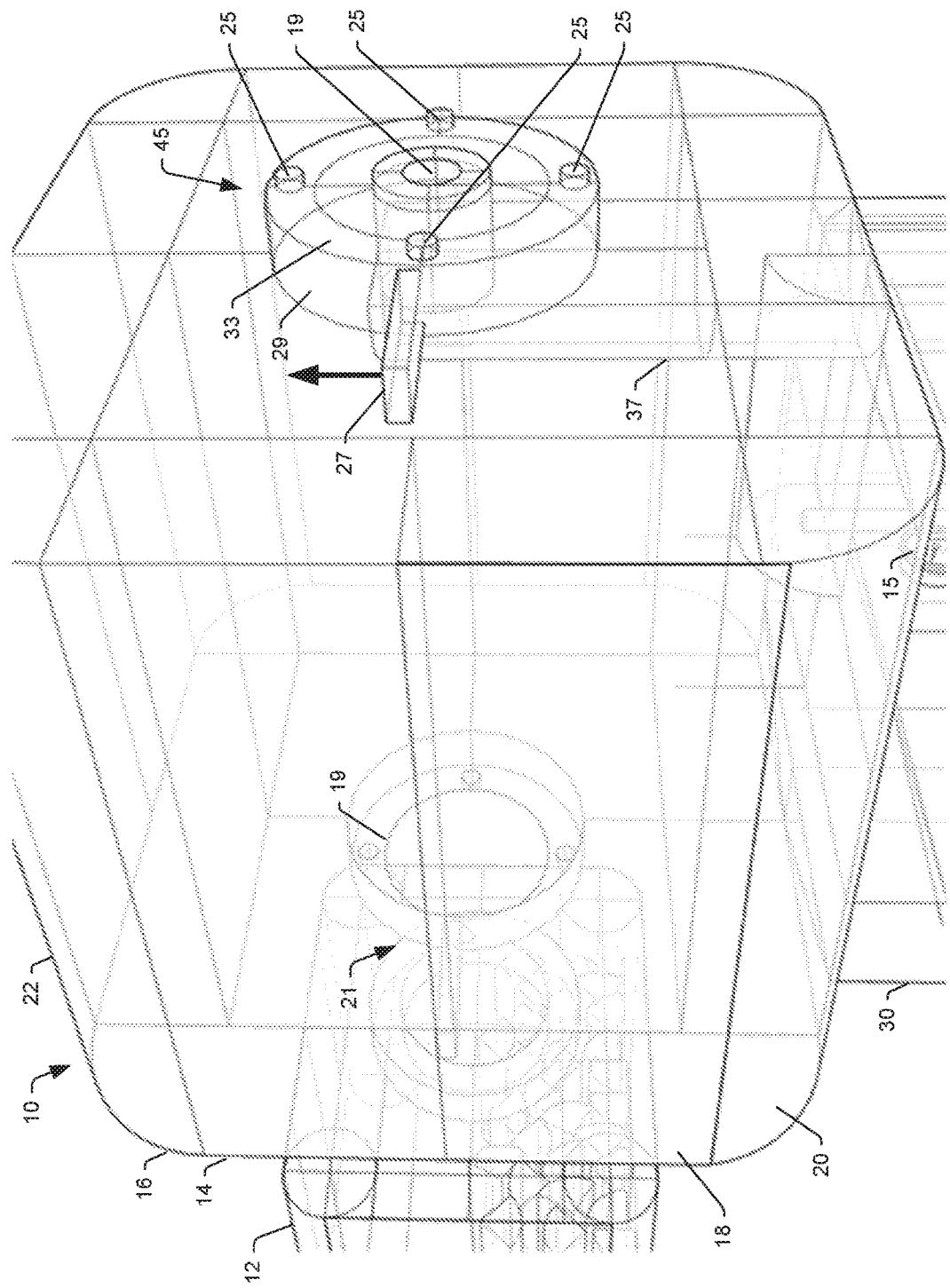
FIG. 9 is a schematic exploded side perspective transparent view of the example cooking apparatus shown in FIG. 1 from the side opposite the side shown in FIG. 6.
Figure 10:
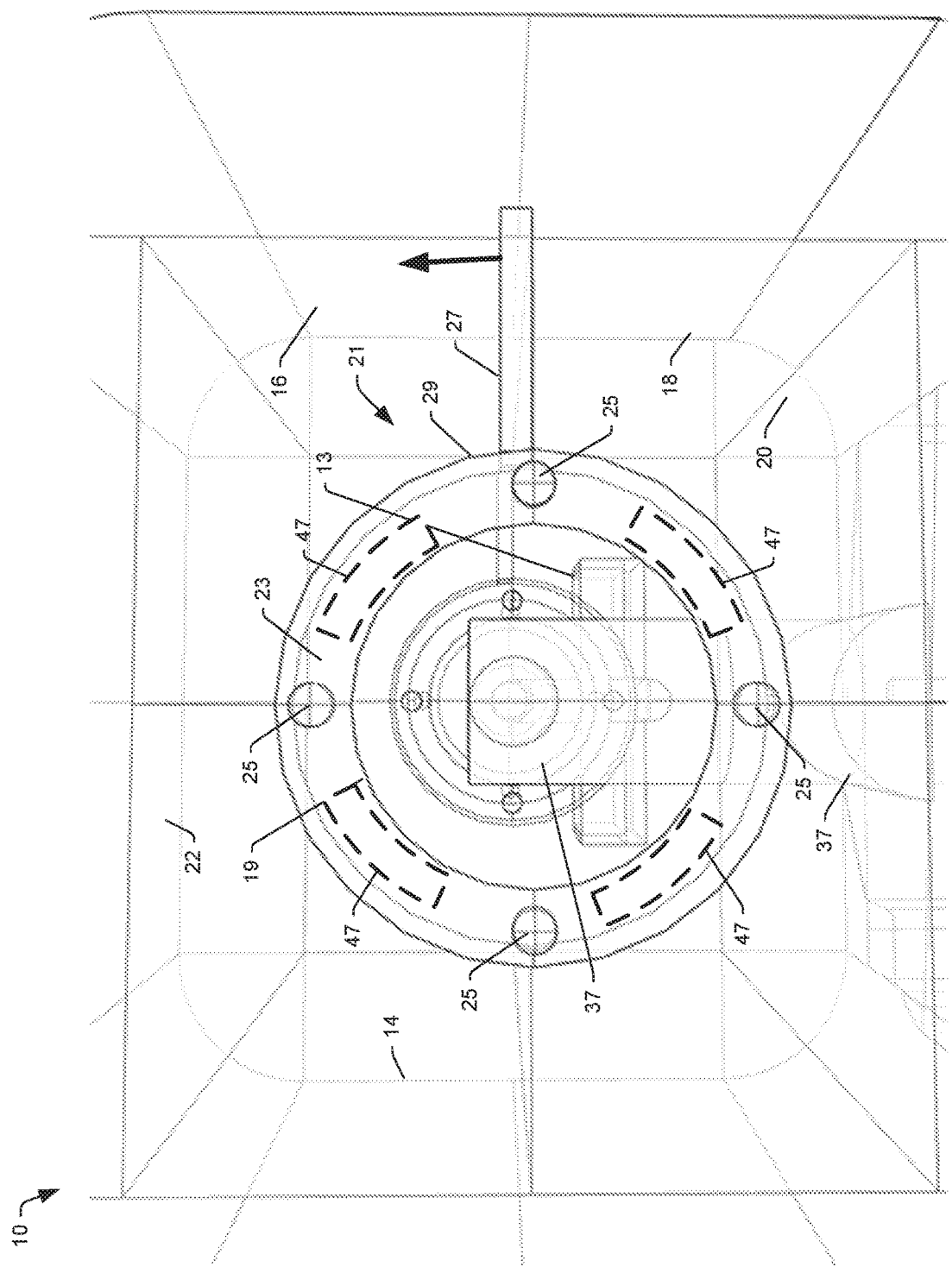
FIG. 10 is a schematic side transparent view from the interior of an example cooking chamber of the example cooking apparatus shown in FIG. 1 facing the example accessory module.
Figure 11:
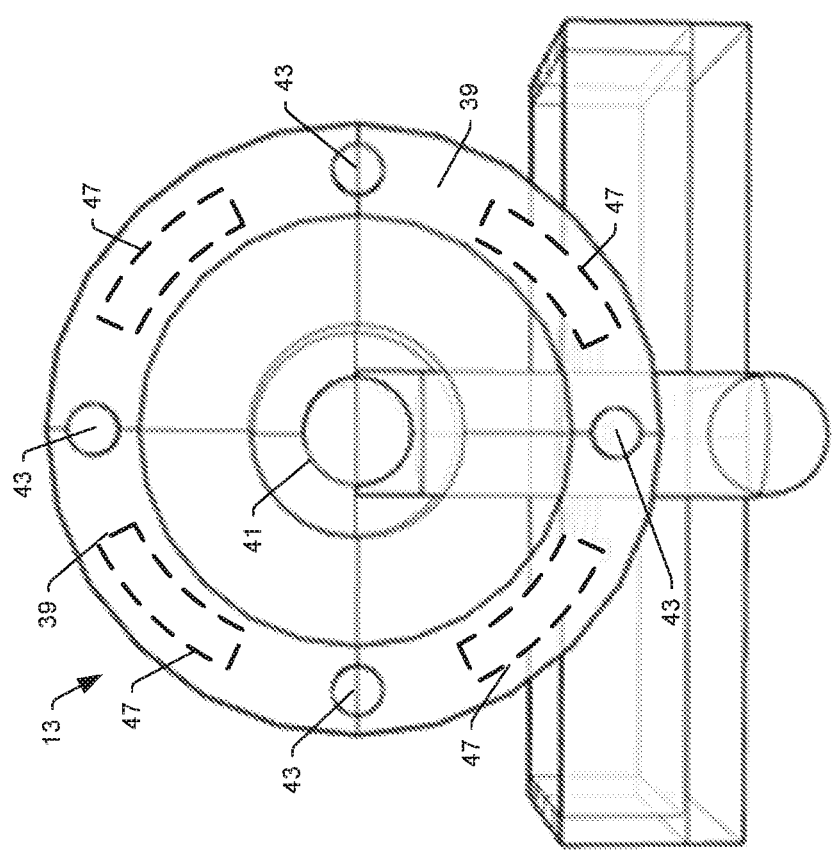
FIG. 11 is a schematic side transparent view of the example accessory module shown in FIG. 1.

As shown in FIGS. 4, 5, 8, 8, 9, and 11, the accessory modules 13 and the cooking chamber 14 may be configured, so that the accessory modules 13 may be coupled and secured to the cooking chamber 14 and released and separated from the cooking chamber 14 in a manner at least similar to the heating modules 12. For example, the cooking chamber 14 may include a chamber aperture 19 configure to receive an accessory module 13. In some examples, the chamber aperture 19 for the accessory module 13 may be relatively smaller than the chamber aperture 19 for the heating module 12, for example, as shown in FIGS. 8, 9, and 10.

Figure 3:
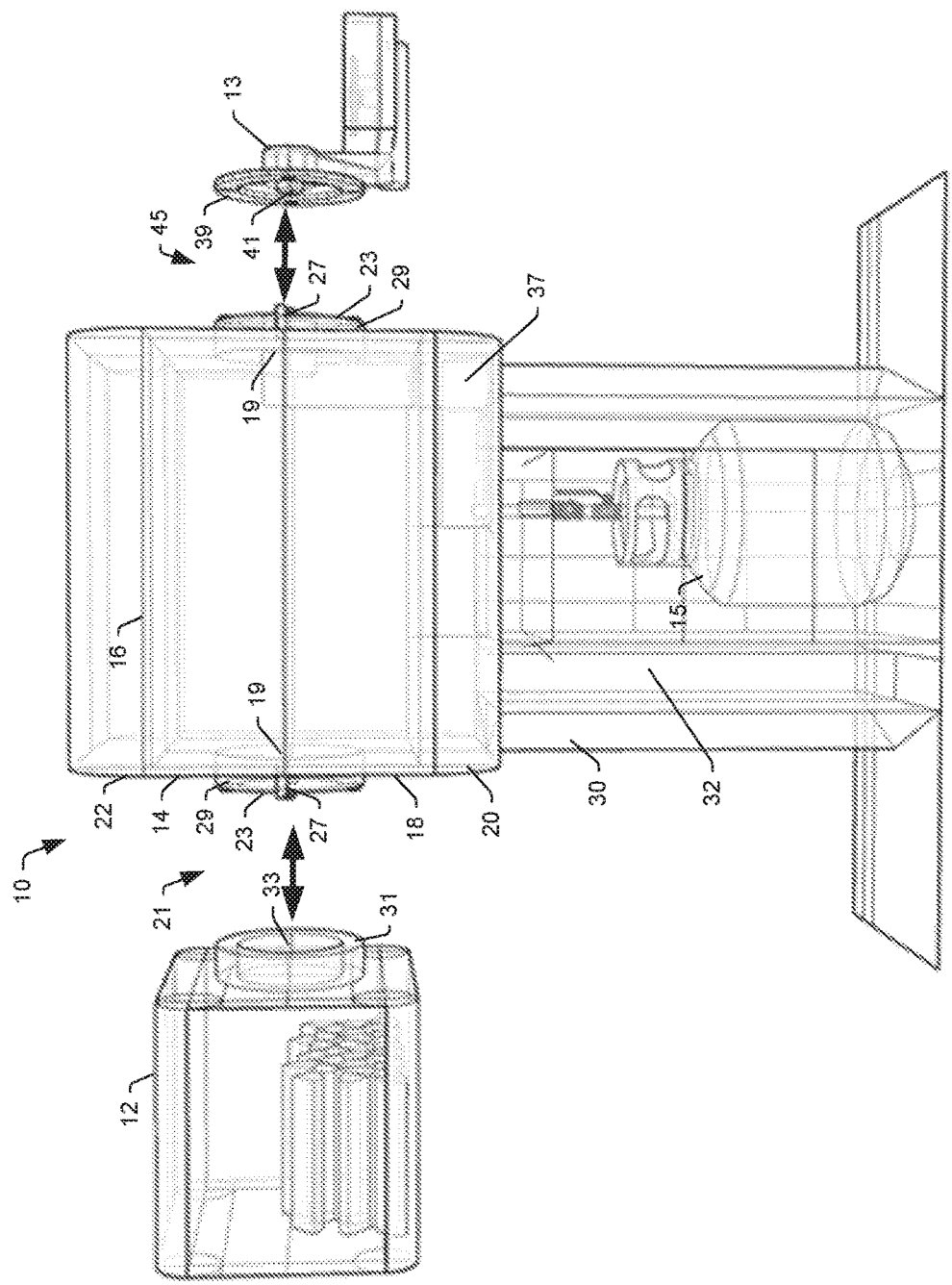
FIG. 3 is a schematic exploded transparent front view of the example cooking apparatus shown in FIG. 1.
Figure 4:
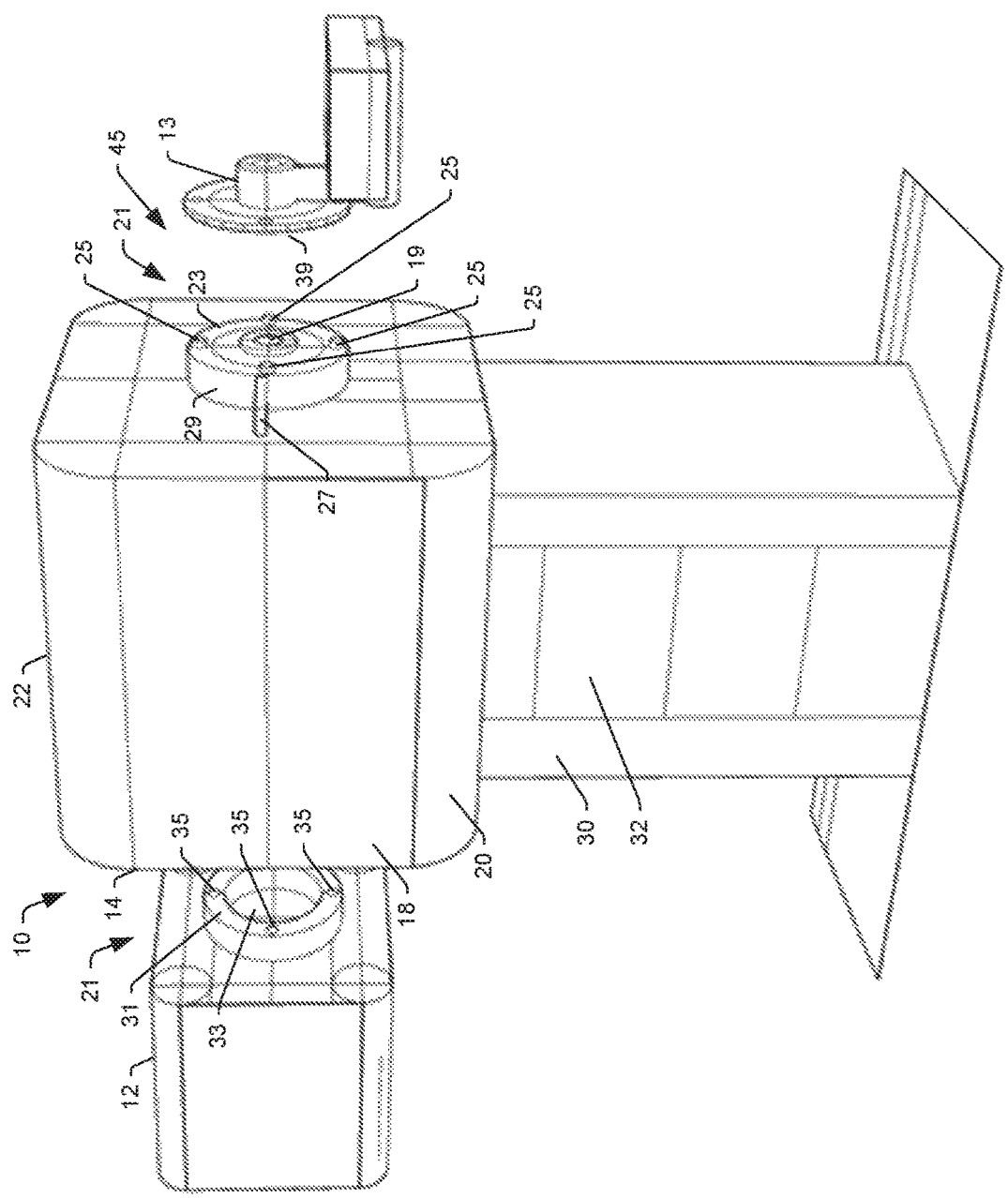
FIG. 4 is a schematic exploded front perspective view of the example cooking apparatus shown in FIG. 1.

As shown in FIG. 3, when the heating module 12 and/or accessory module 13 is/are a stove-top-style burner, the cooking apparatus 10 may include a passage 37 extending from inside the cabinet 30, up into the side of the cooking chamber 14 and to the chamber aperture 19 and the stove-top-style burner.

In the examples shown, some embodiments of the accessory module 13 may include a raised module coupling surface 39 for providing complimentary surface against which a corresponding portion of the raised chamber coupling surface 23 of the cooking chamber 14 may abut and form a seal, so that heat and/or smoke in the interior of the cooking chamber 14 does not escape from the cooking chamber 14 through the chamber aperture 19 at the interface between the accessory module 13 and the cooking chamber 14. In the example shown, the module coupling surface 39 may be formed by an annular extension from a side wall of the accessory module 13 adjacent (e.g., surrounding) a corresponding module aperture 41 of the accessory module 13 for providing a passage from the cooking chamber 14 through the corresponding chamber aperture 19. The raised module coupling surface 39 of the accessory module 13 may also include a plurality of recesses 43 configured to receive therein corresponding nodes 25 of the cooking chamber 14 (e.g., in the raised chamber coupling portion 23). In some embodiments, for securing the accessory modules 13 to the cooking chamber 14, the cooking chamber 14 may include a twist-and-engage mechanism 45 at least similar to the twist-and-engage mechanism 21 described above for coupling and securing the heating module 12 to the cooking chamber 14.

In some examples of the cooking chamber 14, at least one side of the side wall 18 may include a removable cover panel 34 (see, e.g., FIG. 12) configured to close an opening 36 in the side wall 18, for example, as explained with respect to FIG. 13. In some examples, as explained herein, the heating module 12 may be configured to provide a source of heat and/or smoke for the cooking apparatus 10, and in some examples, the heating module 12 may be configured to generate heat and/or smoke using at least one of electricity, a flammable gas, charcoal, pellets (e.g., wood pellets), or wood. For example, the heating module 12 may be configured to be coupled to, and removed from, the lower portion 20 of the cooking chamber 14, and in some such examples, the heating module 12 may include a burner (see, e.g., FIG. 14) configured to be in flow communication with a source of a flammable gas and distribute heat within the cooking chamber 14.

FIG. 12 is a schematic perspective view of another example cooking apparatus 10 including an example heating module 12 coupled to the cooking apparatus 10. In the example shown in FIG. 12, the cooking apparatus 10 includes a cooking chamber 14 at least partially defining an interior volume and a substantially open upper portion 16. Although the example cooking chamber 14 shown in FIG. 12 has a substantially rectangular cross-sectional shape, other cross-sectional shapes are contemplated, such as, for example, substantially circular, oval-shaped, or other geometric shapes. The cooking chamber 14 may be formed from metal, such as, for example, steel, stainless steel, and/or aluminum, and/or ceramic materials.

The example cooking chamber 14 shown in FIG. 12 includes a side wall 18 at least partially defining a lower portion 20 of the cooking chamber 14. The example cooking apparatus 10 also includes a lid 22 configured to substantially close the upper portion 16 of the cooking chamber 14. As shown in FIG. 12, the lid 22 may include a handle 24 and, in some examples, the lid 22 may be fixed to the upper portion 16 of the cooking chamber 14 via one or more hinges, so that the lid 22 may pivot between a closed position and an open position. In some examples, the lid 22 (or the side wall 18) may include a vent 26 (e.g., an adjustable vent), for example, for allowing heat to be vented from the cooking chamber 14 in a controlled manner. As shown in FIG. 12, the cooking apparatus 10 may also include a cooking surface 28 (e.g., a grate, a griddle, and/or a pan) on which food items to be heated/cooked may be placed. In some examples, the cooking apparatus 10 may also include a cabinet 30 for storage and/or access to an underside of the cooking chamber 14. The cabinet 30 may include one or more doors 32 configured to permit access to the interior of the cabinet 30 and/or access to the underside of the cooking chamber 14.

In the example shown in FIG. 12, the cooking apparatus 10 include a heating module 12 configured to be coupled to, and removed from, the lower portion 20 of the cooking chamber 14. In the example shown in FIG. 12, at least one side of the side wall 18 includes a removable cover panel 34 configured to close an opening 36 in the side wall 18 configured to provide flow communication between the heating module 12 and the interior of the cooking chamber 14, for example, as explained with respect to FIG. 13. As explained herein, the heating module 12 may be configured to provide a source of heat for the cooking apparatus 10, and, in some examples, the heating module 12 may be configured to generate heat using at least one of a flammable gas, charcoal, pellets (e.g., wood pellets), or wood. For example, the heating module 12 may be configured to be coupled to, and removed from, the lower portion 20 of the cooking chamber 14, and in some such examples, the heating module 12 may include a burner (see, e.g., FIG. 14) configured to be in flow communication with a source of a flammable gas and distribute heat within the cooking chamber 14.

In the example shown in FIG. 12, the heating module 12 may be removed from (and inserted into) the lower portion 20 of the cooking chamber 14 by sliding the heating module 12 out of the cooking chamber 14 (and into the cooking chamber 14), for example, in a manner similar to removing a drawer from a cabinet. For example, the lower portion 20 of the cooking chamber 14 may define a lower opening, and the cooking apparatus 10 (e.g., the cooking chamber 14) may include a lower cooking chamber fixture adjacent the lower opening. In such examples, the heating module 12 may include a module fixture configured to engage the lower cooking chamber fixture. In some examples (e.g., as shown in FIG. 13), a side wall or portion of the side wall 18 of the cooking chamber 14 may define a side opening, and the cooking apparatus 10 (e.g., the cooking chamber 14) may include a side cooking chamber fixture adjacent the side opening. In such examples, the heating module 12 may include a module fixture configured to engage the side cooking chamber fixture.

Figure 14:
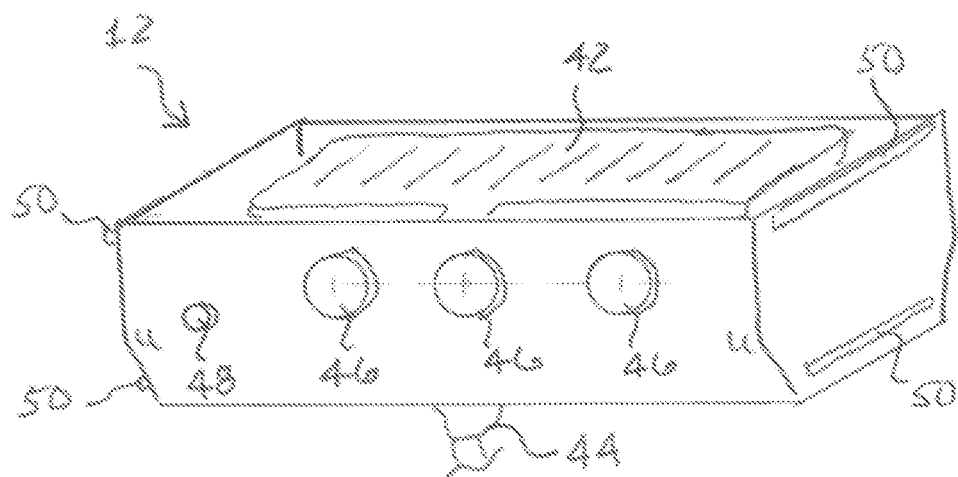
FIG. 14 is a schematic perspective view of another example heating module configured to generate heat using a flammable gas.
Figure 15:
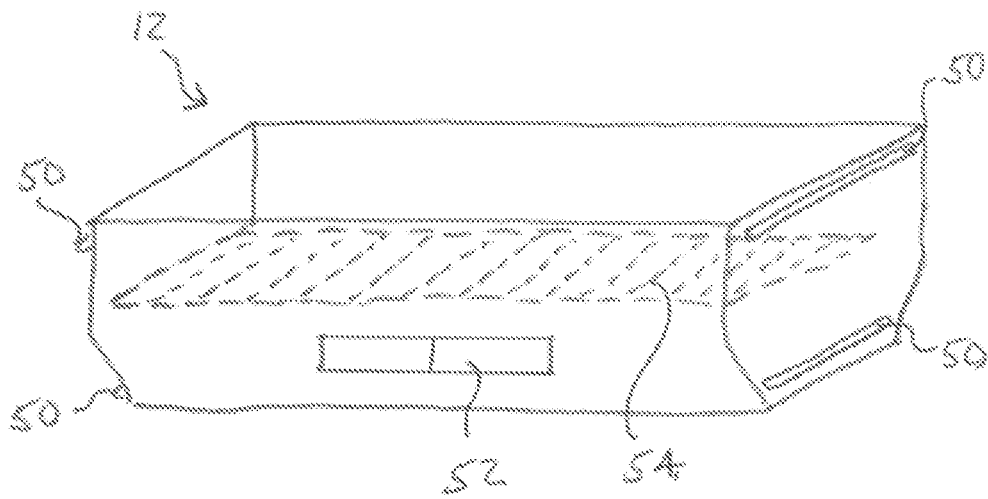
FIG. 15 is a schematic perspective view of another example heating module configured to generate heat using charcoal, pellets, and/or wood.

In some examples, one or more of the heating module 12 or the cooking chamber 14 may include complimentary rails for facilitating sliding of the heating module 12 relative to the cooking chamber 14 (see, e.g., FIGS. 14 and 15). In some examples, alternatively, or in addition, the heating module 12 may include one or more first fasteners, and the cooking chamber 14 may include one or more second fasteners configured to removably engage the one or more first fasteners to couple (and decouple) the heating module 12 and the cooking chamber 14 to/from one another. In some examples, the one or more first fasteners may include one of a stud or a nut, and the one or more second fasteners may include the other of a stud or a nut. In some examples, the first fasteners and/or the second fasteners may be configured or selected to be tightened and/or loosened by hand (e.g., without the use of tools).

FIG. 13 is a schematic perspective view of the example cooking apparatus 10 shown in FIG. 12 including a second example heating module 12 in the process of being moved toward the cooking chamber 14 for being coupled to the cooking chamber 14. As shown in FIG. 13, a side portion of the side wall 18 defines an opening 36 (shown covered by the cover panel 34 in FIG. 12) for providing flow communication between the heating module 12 and an interior of the cooking chamber 14. In some examples, the heating module 12 may include a chamber (e.g., a closed-top or closable-top chamber) configured to receive one or more of charcoal, pellets (e.g., wood pellets), or wood to generate heat for the cooking chamber 14. In the example shown in FIG. 13, the heating module 12 includes an adjustable vent 38 configured facilitate adjustment of the temperature of the burning of the charcoal, pellets, or wood. The example heating module 12 in FIG. 13 also includes a support 40 in the interior of the heating module 12 and spaced from a lower end of the heating module 12. The support 40 may be configured to support the charcoal, pellets, and/or wood during burning. In the absence of a cooking module 12 as shown in FIG. 12, a cover panel 34 may be used to cover an opening in the cooking chamber 14 configured to receive the heating module 12 shown in FIG. 12.

FIG. 14 is a schematic perspective view of an example heating module 12 configured to generate heat using a flammable gas, such as, for example, propane and/or natural gas. As shown in FIG. 14, the example cooking module 12 is configured to correspond to the example heating module shown in FIG. 12, in which the heating module 12 is received in the cooking chamber 14 under the example cooking surface 28, for example, rather than laterally adjacent the cooking surface 28, for example, as shown in FIG. 13. The example heating module 12 shown in FIG. 14 defines an interior chamber (e.g., an open-top chamber) and includes a burner 42 (or burners) received in the interior chamber and configured to combust the flammable gas and/or distribute the heat from burning of the flammable gas. The example heating module 12 shown in FIG. 14 also includes a coupling 44 configured to be coupled to a source of the flammable gas, for example, via a gas line. Although the example coupling 44 shown in FIG. 14 is accessible from an underside of the heating module 12, it is contemplated that the coupling 44 could be accessible elsewhere in relation to the heating module 12 (e.g., from one of the lateral sides or the back).

As shown in FIG. 14, the example heating module 12 may include one or more adjustors 46 (e.g., adjustment knobs) configured to adjust the heat provided by the one or more burners 42. The example heating module 12 shown in FIG. 14 also includes an ignition activator 48 (e.g., a button) configured to initiate ignition of the flammable gas. In some examples, the ignition activator 48 may be electrically coupled to an igniter configured to initiate ignition of the flammable gas, for example, at start-up of heating of the cooking apparatus 10. As described herein, the example heating module 12 shown in FIG. 14 may include one or more rails 50 configured to slidably engage corresponding rails in the cooking chamber 14, for example, so that the heating module 12 may be selectively inserted into, and removed from, the cooking chamber 14. As discussed herein, this may facilitate converting the cooking apparatus 10 between use of flammable gas, charcoal, pellets, or wood as a heating medium for cooking.

FIG. 15 is a schematic perspective view of another example heating module 12 configured to generate heat using charcoal, pellets, or wood. As shown in FIG. 15, the example cooking module 12 is configured to correspond to the example heating module 12 shown in FIG. 12, in which the heating module 12 is received in the cooking chamber 14 under the example cooking surface 28, for example, rather than laterally adjacent the cooking surface 28, for example, as shown in FIG. 13. The example heating module 12 shown in FIG. 15 defines an interior chamber (e.g., an open-top chamber) configured to receive therein one or more of charcoal, pellets (e.g., wood pellets), or wood to generate heat for the cooking chamber 14. In the example shown in FIG. 15, the heating module 12 includes an adjustable vent 52 configured facilitate adjustment of the temperature of the burning of the charcoal, pellets, or wood. The example heating module 12 shown in FIG. 15 also includes a support 54 in the interior of the heating module 12 and spaced from a lower end of the heating module 12. The support 54 may be configured to support the charcoal, pellets, and/or wood during burning. As described herein, the example heating module 12 shown in FIG. 15 may include one or more rails 50 configured to slidably engage corresponding rails in the cooking chamber 14, for example, so that the heating module 12 may be selectively inserted into, and removed from, from the cooking chamber 14. As discussed herein, this may facilitate converting the cooking apparatus 10 between use of flammable gas, charcoal, pellets, or wood as a heating medium for cooking.

In some examples, a heating module 12 may be coupled to the cooking chamber 14 via a universal coupler configured to facilitate coupling the heating module 12 to, and decoupling the heating module 12 from, the cooking apparatus 14, for example, to provide the ability to exchange a first heating module 12 configured to generate heat using a first heating medium, for a second heating module 12 configured to generate heat using a second heating medium different from the first heating medium. In some examples, the universal coupler may include a heating module coupler associated with the heating module, and a cooking chamber coupler associated with the cooking chamber. In some such examples, the heating module coupler and the cooking chamber coupler may be configured to be coupled and decoupled from one another, for example, thereby coupling and decoupling the heating module 12 and the cooking chamber 14 to one another.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof

What is claimed is:

1. A cooking apparatus comprising:
   a cooking chamber at least partially defining an interior volume and a substantially open upper portion, the cooking chamber comprising a side wall at least partially defining a lower portion of the cooking chamber;
   a lid configured to substantially close the upper portion of the cooking chamber; and
   a first heating module configured to be coupled to, and removed from, at least one of the side wall or the lower portion of the cooking chamber,
   wherein the first heating module is configured to provide a source of heat for the cooking apparatus, and
   wherein the first heating module is configured to generate heat using at least one first heating medium consisting essentially of a flammable gas, charcoal, pellets, or wood,
   wherein the cooking apparatus is configured to facilitate removal of the first heating module for replacement with a second heating module configured to generate heat using at least one second heating medium consisting essentially of flammable gas, charcoal, pellets, or wood, and
   wherein the at least one second heating medium is different than the at least one first heating medium.

2. The cooking apparatus of claim 1, wherein the first heating module is configured to be coupled to, and removed from, the side wall of the cooking chamber, and wherein the first heating module is configured to generate heat using one or more of charcoal and wood.

3. The cooking apparatus of claim 1, wherein the first heating module is configured to be coupled to, and removed from, the lower portion of the cooking chamber, and wherein the first heating module comprises a burner configured to be in flow communication with a source of a flammable gas and distribute heat within the cooking chamber.

4. The cooking apparatus of claim 1, wherein the first heating module is configured to be coupled to, and removed from, the lower portion of the cooking chamber, and wherein the first heating module comprises a chamber configured to receive one or more of charcoal or pellets to generate heat.

5. The cooking apparatus of claim 1, wherein:
   the lower portion of the cooking chamber defines a lower opening;
   the cooking apparatus comprises a lower cooking chamber fixture adjacent the lower opening; and
   the first heating module comprises a module fixture configured to engage the lower cooking chamber fixture.

6. The cooking apparatus of claim 1, wherein:
   the side wall of the cooking chamber defines a side opening;
   the cooking apparatus comprises a side cooking chamber fixture adjacent the side opening; and
   the first heating module comprises a module fixture configured to engage the side cooking chamber fixture.

7. The cooking apparatus of claim 1, wherein;
   one or more of the lower portion of the cooking chamber defines a lower opening or the side wall of the cooking chamber defines a side opening;
   the cooking apparatus comprises one or more of a lower cooking chamber fixture adjacent the lower opening or a side cooking chamber fixture adjacent the side opening; and
   the heating module comprises a module fixture configured to engage one or more of the lower cooking chamber fixture or the side cooking chamber fixture,
   wherein one or more of the lower cooking chamber fixture or the side cooking chamber fixture comprises a first rail, and the module fixture comprises a second rail, and wherein the first rail and the second rail are configured to slidably engage one another and facilitate coupling and decoupling of the first heating module and the cooking chamber.

8. The cooking apparatus of claim 1, wherein;
   one or more of the lower portion of the cooking chamber defines a lower opening or the side wall of the cooking chamber defines a side opening;
   the cooking apparatus comprises one or more of a lower cooking chamber fixture adjacent the lower opening or a side cooking chamber fixture adjacent the side opening; and
   the heating module comprises a module fixture configured to engage one or more of the lower cooking chamber fixture or the side cooking chamber fixture,
   wherein one or more of the lower cooking chamber fixture or the side cooking chamber fixture comprises one or more first fasteners, and the module fixture comprises one or more second fasteners, and
   wherein the one or more first fasteners and the one or more second fasteners are configured to engage one another and facilitate coupling and decoupling of the first heating module and the cooking chamber.

9. The cooking apparatus of claim 8, wherein the one or more first fasteners comprise one of a stud or a nut, and the one or more second fasteners comprise the other of a stud or a nut.

10. The cooking apparatus of claim 1, the cooking chamber comprises a first coupling device, and the first heating module comprises a second coupling device, and wherein first coupling device and the second coupling device are configured to engage and disengage one another to facilitate coupling of the first heating module to, and removal of the first heating module from, the cooking chamber.

11. The cooking apparatus of claim 1, further comprising a universal coupler configured to facilitate coupling the first heating module to, and decoupling the first heating module from, the cooking apparatus, the universal coupler comprising a heating module coupler associated with the first heating module and a cooking chamber coupler associated with the cooking chamber, wherein the heating module coupler and the cooking chamber coupler are configured to be coupled and decoupled from one another.

12. A cooking apparatus comprising:
a cooking chamber at least partially defining an interior volume and a substantially open upper portion, the cooking chamber comprising a side wall at least partially defining a lower portion of the cooking chamber;
a lid configured to substantially close the upper portion of the cooking chamber;
a first heating module configured to be coupled to, and removed from, at least one of the side wall or the lower portion of the cooking chamber; and
a twist-and-engage mechanism configured to selectively couple the heating module to the at least one of the side wall or the lower portion of the cooking chamber,
wherein the first heating module is configured to provide a source of heat for the cooking apparatus,
wherein the first heating module is configured to generate heat using at least one first heating medium consisting essentially of flammable gas, charcoal, pellets, or wood,
wherein the cooking apparatus is configured to facilitate removal of the first heating module for replacement with a second heating module configured to generate heat using at least one second heating medium consisting essentially of flammable gas, charcoal, pellets, or wood, and
wherein the at least one second heating medium is different than the at least one first heating medium.

13. The cooking apparatus of claim 12, wherein the twist-and-engage mechanism comprises a pivoting handle configured pivot from a first position to a second position at which the first heating module and the at least one of the side wall or the lower portion of the cooking chamber are secured to one another.

14. The cooking apparatus of claim 12, wherein the twist-and-engage mechanism comprises one or more magnets configured to secure the first heating module to the at least one of the side wall or the lower portion of the cooking chamber.

15. The cooking apparatus of claim 12, further comprising an accessory module configured to be coupled to, and removed from, at least one of the side wall or the lower portion of the cooking chamber.

16. The cooking apparatus of claim 12, wherein the accessory module comprises one or more of lighting, a fan, a speaker, a towel dispenser, or a side burner.

17. A method for converting a cooking apparatus from a first configuration intended for use with a first heat source to a second configuration intended for use with a second heat source, the method comprising:
separating a first heating module from a side wall or a lower portion of a cooking chamber of the cooking apparatus, the first heating module configured to generate heat using at least one first heating medium; and
coupling a second heating module to the side wall or the lower portion of the cooking chamber, the second heating module configured to generate heat using at least one second heating medium different than the at least one first heating medium,
wherein the at least one first heating medium and the at least one second heating medium comprise one or more of a flammable gas, charcoal, wood, or pellets.

18. The method of claim 17, wherein separating the first heating module from the side wall or the lower portion of the cooking chamber comprises removing at least one fastener coupling the first heating module to the cooking chamber, and coupling the second heating module to the side wall or the lower portion of the cooking chamber comprises securing at least one fastener such that the least one fastener couples the second heating module to the cooking chamber.

19. The method of claim 17, wherein separating the first heating module from the side wall or the lower portion of the cooking chamber comprises slidably disengaging the first heating module from the side wall or the lower portion of the cooking chamber, and coupling the second heating module to the side wall or the lower portion of the cooking chamber comprises slidably engaging the second heating module with the side wall or the lower portion of the cooking chamber.

* * * * *